(12) United States Patent
Kitada

(10) Patent No.: US 12,072,230 B2
(45) Date of Patent: Aug. 27, 2024

(54) ELECTRONIC DEVICE

(71) Applicant: Murata Manufacturing Co., Ltd., Nagaokakyo (JP)

(72) Inventor: Hiroaki Kitada, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 149 days.

(21) Appl. No.: 18/047,390

(22) Filed: Oct. 18, 2022

(65) Prior Publication Data

US 2023/0116596 A1 Apr. 13, 2023

Related U.S. Application Data

(63) Continuation of application No. PCT/JP2022/008474, filed on Feb. 28, 2022.

(30) Foreign Application Priority Data

Mar. 18, 2021 (JP) ................. 2021-045237

(51) Int. Cl.
*H04R 1/02* (2006.01)
*G01H 1/12* (2006.01)
(Continued)

(52) U.S. Cl.
CPC ............. *G01H 11/08* (2013.01); *G01H 1/12* (2013.01); *H04R 1/1016* (2013.01); *H04R 1/1058* (2013.01)

(58) Field of Classification Search
CPC .... H04R 1/1041; H04R 29/00; H04R 29/001; H04R 25/65
See application file for complete search history.

(56) References Cited

U.S. PATENT DOCUMENTS 10,045,136 B2 * 8/2018 Clerici Beltrami .... H04R 3/007
10,659,866 B2 * 5/2020 Smith .................... G01L 1/142
(Continued)

FOREIGN PATENT DOCUMENTS

CN  111050243 A * 4/2020 ............... H04R 1/10
CN  114993526 A * 9/2022
(Continued)

OTHER PUBLICATIONS

International Search Report in PCT/JP2022/008474, mailed Apr. 5, 2022, 3 pages.

*Primary Examiner* — Ryan Robinson
(74) *Attorney, Agent, or Firm* — ArentFox Schiff LLP

(57) ABSTRACT

An electronic device is provided that includes a first casing and a second casing, and a distortion sensor attached to an inner wall of the casing. One side of the first casing is opened by a first opening, one side of the second casing is opened by a second opening, the casing is formed by fixing the first casing to the second casing to face each other. Moreover, the first and second casings are fixed by two or more fixing portions, the distortion sensor has a strip shape having first and second ends in the longitudinal direction, and the distortion sensor is attached to an inner wall of the second casing such that the longitudinal direction is a direction along an edge of the second opening, the first end is relatively close to the fixing portion, and the second end is far from the fixing portion.

20 Claims, 5 Drawing Sheets

(51) Int. Cl.
*G01H 11/08* (2006.01)
*H04R 1/10* (2006.01)

(56) References Cited

U.S. PATENT DOCUMENTS

| | | | |
|---|---|---|---|
| 10,993,014 B1* | 4/2021 | Xu | H04R 5/033 |
| 11,238,840 B2* | 2/2022 | Bernal Castillo | H03G 5/16 |
| 2012/0313874 A1* | 12/2012 | Chappaz | G08B 6/00 29/25.35 |
| 2014/0049137 A1 | 2/2014 | Ando et al. | |
| 2017/0094389 A1 | 3/2017 | Saulsbury et al. | |
| 2020/0245074 A1 | 7/2020 | Tsuchihashi et al. | |
| 2023/0055725 A1* | 2/2023 | Wang | H04R 9/06 |
| 2023/0370761 A1* | 11/2023 | Li | H04R 1/1016 |

FOREIGN PATENT DOCUMENTS

| | | | | |
|---|---|---|---|---|
| CN | 112492435 B | * | 3/2023 | H04R 1/1016 |
| JP | H110059 Y | | 3/1989 | |
| JP | 3321532 B2 | | 9/2002 | |
| JP | 2002262377 A | | 9/2002 | |
| JP | 2018534844 A | | 11/2018 | |
| JP | 2019087790 A | | 6/2019 | |
| JP | 2020150320 A | | 9/2020 | |
| WO | 2012137897 A1 | | 10/2012 | |

\* cited by examiner

ELECTRONIC DEVICE

CROSS REFERENCE TO RELATED APPLICATIONS

This application is a continuation of PCT Application No. PCT/JP2022/008474, filed Feb. 28, 2022, which claims priority to Japanese Patent Application No. 2021-045237, filed Mar. 18, 2021, the entire contents of each of which are hereby incorporated by reference in their entirety.

TECHNICAL FIELD

The present invention relates to an electronic device including a casing and a distortion sensor.

BACKGROUND

In general, Japanese Patent Application Laid-Open No. 2019-87790 (hereinafter "Patent Document 1") discloses an electronic device that is an earphone. FIGS. 5(A) and 5(B) illustrate an earphone 1000 disclosed in Document 1. However, FIGS. 5(A) and 5(B) are both sectional views of the earphone 1000, and FIG. 5(B) illustrates an arrow I-I' portion of FIG. 5(A).

As shown, the earphone 1000 has a hollow cylindrical casing 101. The casing 101 has an inner bottom surface 101a, an outer bottom surface 101b, an inner side surface 101c, an outer side surface 101d, an inner top surface 101e, and an outer top surface 101f. It is noted that the inner bottom surface 101a to the outer top surface 101f are terms and reference symbols provided for purposes of this disclosure to explain the technology and are not used in Document 1.

Moreover, in the earphone 1000, a connecting pipe 102 is connected to the outer top surface 101f of the casing 101. In the earphone 1000, the connecting pipe 102 is connected to an ear piece (e.g., an ear hole insertion portion) 103 that can be inserted into a human ear hole.

In the earphone 1000, a sheet-shaped piezoelectric element 104, as a sounding body, is attached to a hollow inner side surface 101c of the casing 101.

The earphone 1000 is used by being connected to a main body electronic device (not illustrated) such as a smartphone and a recording and reproducing device (including a music reproducing device) in a wireless or wired manner. The earphone 1000 generates sound from the sheet-shaped piezoelectric element 104 based on a signal transmitted from the main body electronic device in a state where the ear piece 103 is inserted into the human ear hole.

The present applicant has studied that a distortion sensor (not illustrated) is further attached to the inner side surface 101c of the casing 101 in the earphone 1000 (an example of an electronic device) as disclosed in Document 1 described above and is used for controlling the main body electronic device.

That is, the outer side surface 101d of the casing 101 is pressed, and thus, distortion occurs in the casing 101. The distortion sensor generates a signal in accordance with the distortion generated in the casing 101. The present applicant has studied that the signal is transmitted to the main body electronic device and is used for controlling the main body electronic device. It is noted that details of the distortion sensor are disclosed in, for example, WO 2012/137897 (hereinafter "Patent Document 2").

For example, the main body electronic device can be controlled as described as follows, although it is noted that this control is an example when the main body electronic device is a music reproducing device.

When the outer side surface 101d of the casing 101 is continuously pressed for a certain period of time or more in a state where a power source of the main body electronic device is turned off, the power source of the main body electronic device is turned on.

When the outer side surface 101d of the casing 101 is continuously pressed for a certain period of time or more in a state where the power source of the main body electronic device is turned on, the power source of the main body electronic device is turned off.

When the outer side surface 101d of the casing 101 is pressed once for a short period of time in a state where the power source of the main body electronic device is turned on, reproduction of music starts.

When the outer side surface 101d of the casing 101 is continuously pressed twice for a short period of time in a state where the power source of the main body electronic device is turned on, the reproduction of the currently reproduced music is stopped and the reproduction of next music is started.

However, it is again noted that the control method described above is merely an example, and the control method is not limited thereto.

As described above, when an attempt is made to control the main body electronic device by attaching the distortion sensor to the inner side surface 101c of the casing 101 of the earphone 1000 and pressing the outer side surface 101d of the casing 101, malfunction occurred in the main body electronic device in a specific aspect. Specifically, when the ear piece 103 of the earphone 1000 is inserted into the human ear hole, malfunction occurs in the main body electronic device. A cause of the malfunction of the main body electronic device has been examined, and the following cause has been found.

Moreover, when the ear piece 103 of the earphone 1000 is inserted into the human ear hole, generally, the outer bottom surface 101b of the casing 101 is pressed with a finger to push the ear piece 103 into the human ear hole in many cases. The shape of the casing 101 is distorted by the pressing of the outer bottom surface 101b of the casing 101.

Although the pressing of the outer bottom surface 101b of the casing 101 does not control the main body electronic device, the distortion sensor detects the distortion of the casing 101 due to the pressing and generates a signal. This signal is not a control signal, but in fact an erroneous signal that is still transmitted to the main body electronic device to operate the main body electronic device.

As described above, it has been found that when the ear piece 103 is inserted into the human ear hole, the main body electronic device malfunctions due to the erroneous signal generated by the distortion sensor.

SUMMARY OF THE INVENTION

Accordingly, the present invention provides an electronic device in which a distortion sensor does not generate an erroneous signal though an outer bottom surface of a casing is pressed.

In an exemplary aspect, an electronic device is provided that includes a casing (or housing) including at least a first casing and a second casing, and a distortion sensor attached to an inner wall of the casing. One side of the first casing is opened by a first opening, one side of the second casing is opened by a second opening, the casing is formed by fixing the first casing and the second casing to face each other, such that the first and second casings are fixed by two or more fixing portions, the distortion sensor has a strip shape having a longitudinal direction and a lateral direction and having a first end and a second end at both ends in the longitudinal direction, and the distortion sensor is attached to an inner wall of the second casing such that the longitudinal direction is a direction along an edge of the second opening, the first end is relatively close to the fixing portion, and the second end is far from the fixing portion.

According to the electronic device according to the exemplary aspect, the distortion sensor favorably generates a signal when the side surface of the casing is favorably pressed. On the other hand, when the bottom surface of the casing is pressed, the distortion sensor does not generate a signal or generates only an extremely small signal.

According to the electronic device according to the exemplary aspect, since the occurrence of an erroneous signal due to the distortion sensor is prevented, the malfunction of the main body electronic device can be prevented.

DETAILED DESCRIPTION

Figure 1A:
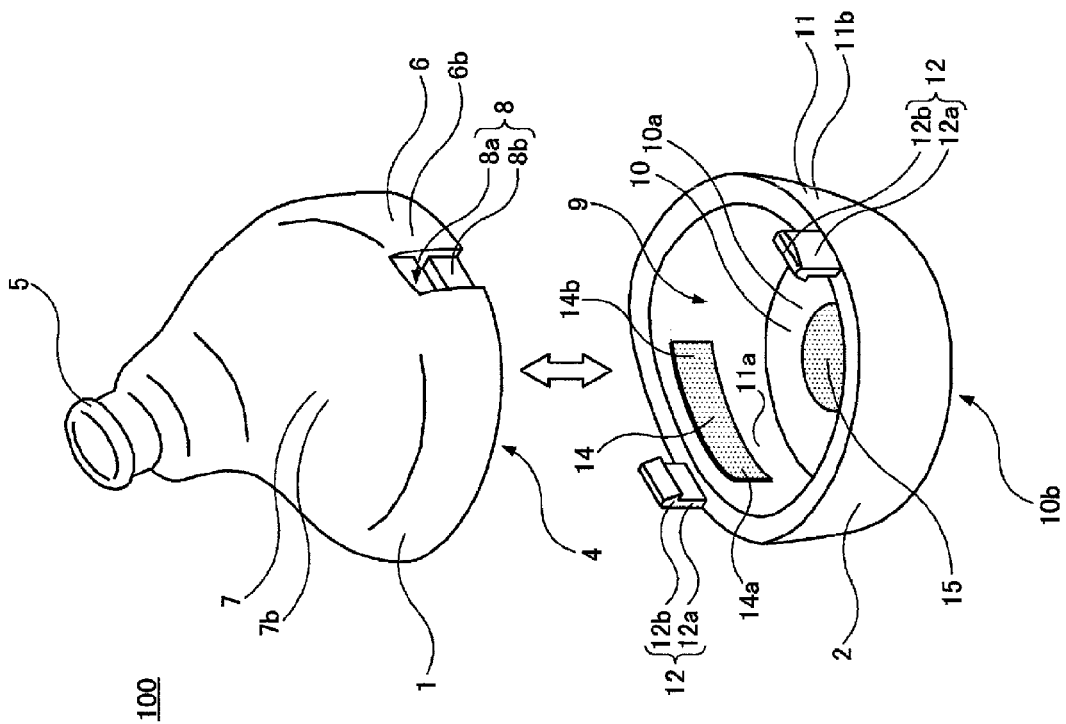
FIG. 1(A) is a perspective view of an earphone 100.

Hereinafter, an exemplary embodiment of the present invention will be described with reference to the drawings.

Each embodiment exemplarily illustrates the exemplary aspects of the invention, but the present invention is not limited to the contents of the embodiment. As would be appreciated to one skilled in the art, the different embodiments can be combined and implemented. The drawings are intended to help understanding of the specification, and may be schematically drawn, and drawn components or ratios in dimensions between the components may not match ratios in dimensions described in the specification. The components described in the specification may be omitted in the drawings, or the number of components may be omitted.

Figure 1B:
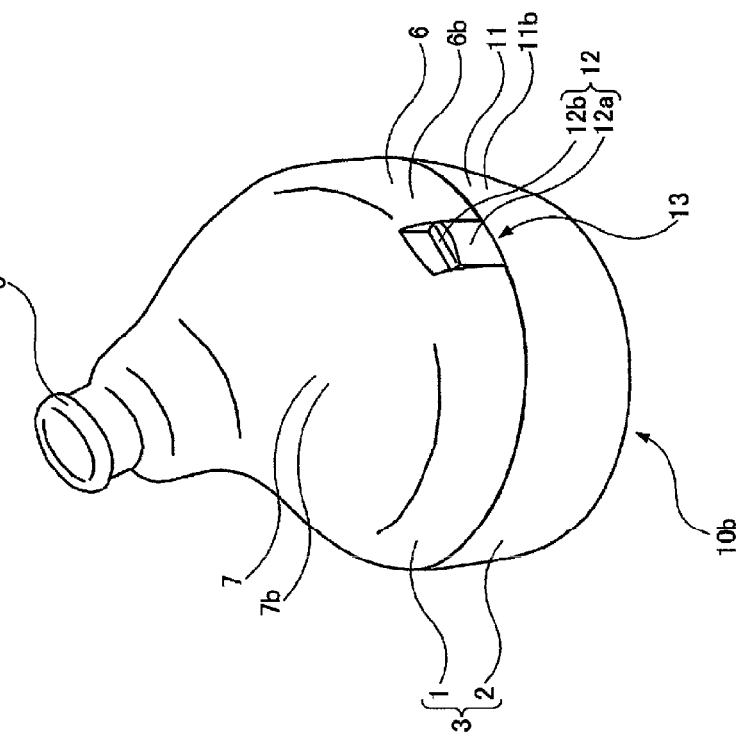
FIG. 1(B) is an exploded perspective view of the earphone 100 according to an exemplary aspect.
Figure 2:
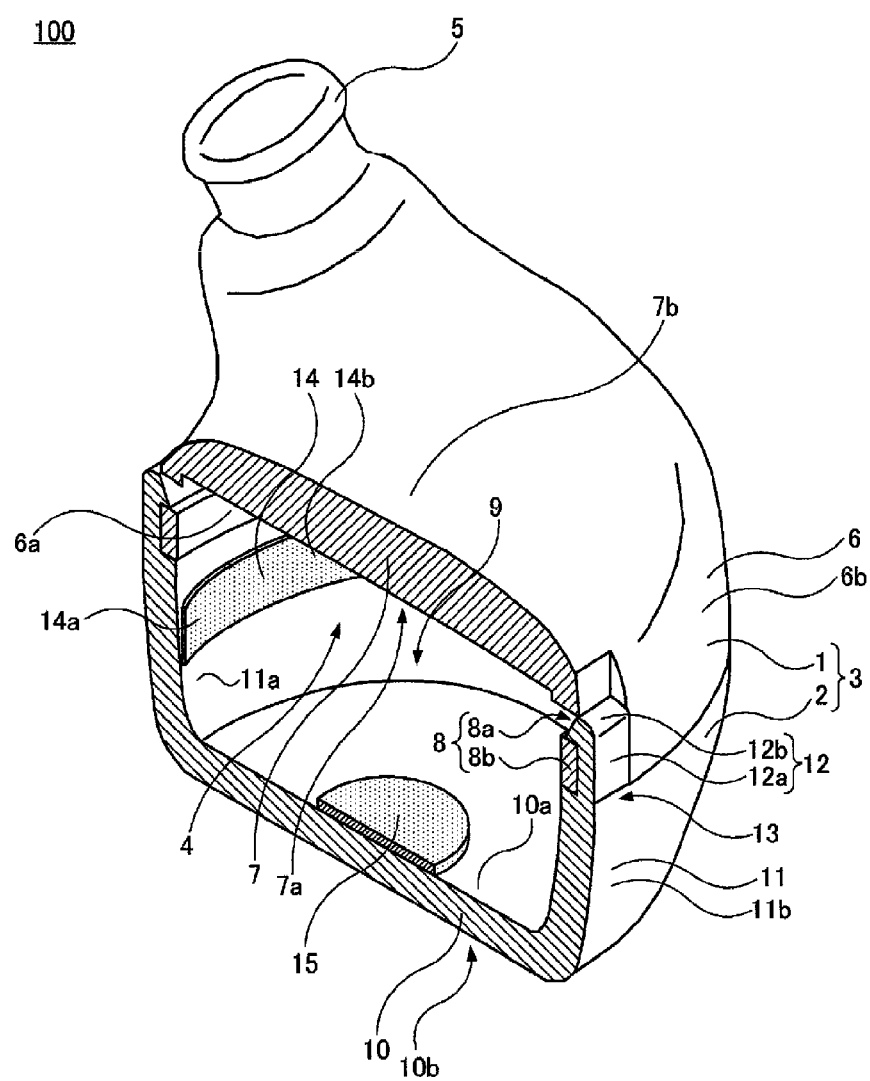
FIG. 2 is a partial sectional perspective view of the earphone 100 according to an exemplary aspect.

FIGS. 1(A), 1(B), and 2 illustrate an earphone 100 as an electronic device according to an exemplary embodiment. However, it is noted that the electronic device described herein is not limited to the earphone, and can be another type of electronic device, such as a hearing aid or a headset, for example.

FIG. 1(A) is a perspective view of the earphone 100. FIG. 1(B) is an exploded perspective view of the earphone 100 and illustrates a state where a first casing 1 and a second casing 2 (collectively referred to as a casing or housing) to be described later are detached from each other. FIG. 2 is a partial sectional perspective view in which a part of the earphone 100 is sectioned.

As shown, the earphone 100 includes a casing 3 including the first casing 1 (e.g., an upper casing) and the second casing 2 (e.g., a lower casing). A material of the casing 3 (the first casing 1 and the second casing 2) can be any material, but, for example, resin can be used in an exemplary aspect.

One end of the first casing 1 is opened by a first opening 4, and an inside of the first casing 1 is hollow. A tubular (e.g., hollow) ear hole insertion portion 5 that can be inserted into a human ear hole is provided at the other end of the first casing 1. A portion other than a portion of the other end of the first casing 1 at which the ear hole insertion portion 5 is provided is closed.

As a result, the first casing 1 has a side surface 6 and a top surface 7. The side surface 6 has an inner side surface 6a and an outer side surface 6b. The top surface 7 has an inner top surface 7a and an outer top surface 7b.

A shape of the first opening 4 viewed in an opening direction is any shape, but the first opening 4 has a substantially circular shape in an exemplary aspect. In the present embodiment, the first casing 1 has a substantially cylindrical shape.

In the first casing 1, locking portions 8 for locking claw portions 12 provided in the second casing 2 to be described later are formed. The locking portions 8 may have any structure, shape, or the like as long as the locking portions are configured to lock the claw portions 12. In the present embodiment, a rectangular through-hole 8a formed so as to penetrate the side surface 6 and a locking beam 8b provided adjacent to the through-hole 8a are included. The number of locking portions 8 can be any number, but is two in the exemplary embodiment.

One end of the second casing 2 is opened by a second opening 9, and an inside of the second casing 2 is hollow. The other end of the second casing 2 is closed.

As a result, the second casing 2 has a bottom surface 10 and a side surface 11. The bottom surface 10 has an inner bottom surface 10a and an outer bottom surface 10b. The side surface 11 has an inner side surface 11a and an outer side surface 11b.

A shape of the second opening 9 viewed in an opening direction is any shape, but the second opening 9 has a substantially circular shape in the exemplary embodiment. Moreover, the second casing 2 has a substantially cylindrical shape in an exemplary aspect.

The claw portions 12 that can be locked to the locking portions 8 provided in the first casing 1 are formed at an edge of the second opening 9 of the second casing 2. In particular, the claw portion 12 includes a column portion 12a and a claw 12b provided at a distal end of the column portion 12a. The number of claw portions 12 can be any number, but the number of claw portions is 2 which is the same as the number of locking portions 8 in the exemplary embodiment.

The casing 3 is formed by fixing the first casing 1 and the second casing 2 to each other in a state where the first opening 4 and the second opening 9 face each other.

In the present embodiment, the first casing 1 and the second casing 2 are fixed by locking the claws 12b of the claw portions 12 to the locking beams 8b of the locking portions 8. However, the first casing 1 and the second casing 2 may be fixed by other methods as would be appreciated to one skilled in the art.

Portions where the first casing 1 and the second casing 2 are fixed are referred to as fixing portions 13. In the present embodiment, portions where the locking portions 8 and the claw portions 12 are provided correspond to the fixing portions 13.

In the present embodiment, the locking portions 8 are provided in the first casing 1 and the claw portions 12 are provided in the second casing 2, but these formation positions may be reversed or switched in an exemplary aspect. That is, the claw portions 12 can be provided in the first casing 1, and the locking portions 8 can be provided in the second casing 2 in an alternative exemplary aspect.

The earphone 100 includes a distortion sensor 14. The distortion sensor 14 is, for example, a piezoelectric distortion sensor. The distortion sensor 14 includes, for example, electrodes formed on both principal surfaces of a piezoelectric sheet containing polylactic acid. The piezoelectric sheet is preferably stretched in at least a uniaxial direction.

As further shown, the distortion sensor 14 has a strip shape having a longitudinal direction and a lateral direction and having a first end 14a and a second end 14b at both ends in the longitudinal direction. The distortion sensor 14 is attached to the inner side surface 11a of the second casing 2 such that the longitudinal direction is a direction along the edge of the second opening 9, the first end 14a is relatively close to the fixing portion 13 (e.g., the locking portion 8 and the claw portion 12), and the second end 14b is relatively far from the fixing portion 13. For purposes of this disclosure, it is noted that the inner side surface 11a of the second casing 2 is synonymous with an inner wall of the second casing 2.

Moreover, the distortion sensor 14 is configured to output (e.g., generate) a signal while an external force applied to the second casing 2 changes, that is, while the strain of the second casing 2 changes.

The earphone 100 includes a sounding body 15 in the casing 3. A type of the sounding body 15 can be any type. An attachment position of the sounding body 15 in the casing 3 can also be any position, but the sounding body 15 is attached to the inner bottom surface 10a of the second casing 2 in the exemplary embodiment.

Although not illustrated, the earphone 100 includes a communication module in the casing 3. The communication module is for wirelessly connecting the earphone 100 and an external main body electronic device (not illustrated), such as by a wireless connection (e.g., Bluetooth®). The earphone 100 transmits the signal generated by the distortion sensor 14 to the main body electronic device via the communication module. Moreover, the main body electronic device transmits an audio signal, a music signal, and the like, to the earphone 100 via the communication module. In the earphone 100, the sounding body 15 emits sound based on the audio signal, the music signal, and the like.

The connection between the earphone 100 and the main body electronic device may be a wired connection instead of the wireless connection in an alternative aspect.

Although not illustrated, the earphone 100 includes a power source such as a secondary battery in the casing 3. The power source is for driving the distortion sensor 14, the sounding body 15, the communication module, and the like.

The earphone 100 presses the outer side surface of the casing 3 (i.e., the outer side surface 6b of the first casing 1 or the outer side surface 11b of the second casing 2), and thus, the casing 3 is distorted. The earphone 100 detects the distortion of the casing 3 by the distortion sensor 14 and generates a signal from the distortion sensor 14. The earphone 100 can transmit the signal to the main body electronic device to control the main body electronic device.

Examples of the main body electronic device include a smartphone, a tablet terminal, a personal computer, a recording and reproducing device (including a music reproducing device), a video reproducing device, a radio, a television, and the like.

As described above, for example, when the main body electronic device is the music reproducing device, the following control can be performed.

When the outer side surface of the casing 3 is continuously pressed for a certain period of time or more (e.g., a predetermined time threshold) in a state where the power source of the main body electronic device is turned off, the power source of the main body electronic device is turned on.

When the outer side surface of the casing 3 is continuously pressed for a certain period of time or more (e.g., a predetermined time threshold) in a state where the power source of the main body electronic device is turned on, the power source of the main body electronic device is turned off.

When the outer side surface of the casing 3 is pressed once for a short period of time in a state where the power source of the main body electronic device is turned on, the reproduction of music is started.

When the outer side surface of the casing 3 is continuously pressed twice for a short period of time in a state where the power source of the main body electronic device is turned on, the reproduction of the currently reproduced music is stopped and the reproduction of next music is started.

However, the control method is not limited thereto, and other control methods are also conceivable.

As described above, earphone 100 can control the main body electronic device by pressing the outer side surface of the casing 3.

On the other hand, with the above described configuration, when the ear hole insertion portion 5 is inserted into the human ear hole, though the outer bottom surface 10b of the second casing 2 is pressed with a finger or the like, the earphone 100 prevents the occurrence of malfunction in the main body electronic device.

More specifically, in the earphone 100, the distortion sensor 14 is attached to the inner side surface 11a of the second casing such that the longitudinal direction is the direction along the edge of the second opening 9, the first end 14a is relatively close to the fixing portion 13 (e.g., the locking portion 8 and the claw portion 12), and the second end 14b is relatively far from the fixing portion 13. Accordingly, though the outer bottom surface 10b of the second casing 2 is pressed, the distortion sensor 14 is configured to not generate a signal or generate only an extremely small signal.

That is, in the earphone 100, the distortion sensor 14 is attached to the inner side surface 11a of the second casing under the above conditions, and thus, though the distortion sensor 14 presses the outer bottom surface 10b of the second casing 2, the first end 14a of the distortion sensor 14 expands in a lower region and contracts in an upper region, whereas the second end 14b of the distortion sensor 14 contracts in the lower region and expands in the upper region. Accordingly, the signal is canceled in the distortion sensor 14, and the distortion sensor 14 does not generate a signal or generate only an extremely small signal. This mechanism will be described in Experiment 1 to be described below.

Experiment 1

In order to confirm the effectiveness of the exemplary embodiment of the present invention, the following Experiment 1 was performed.

Figure 3A:
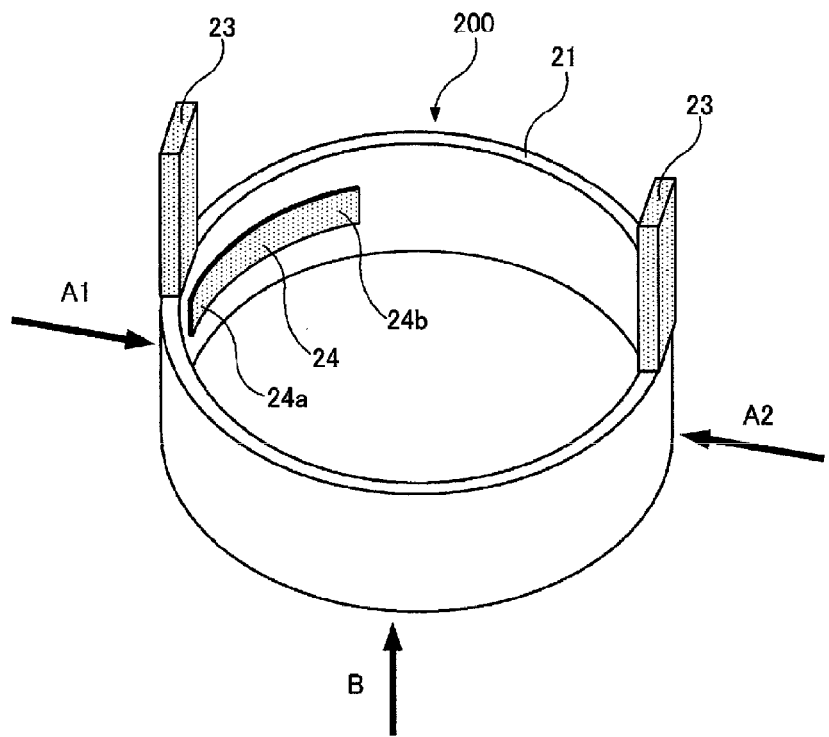
FIG. 3(A) is an explanatory diagram of an experimental device 200 according to an exemplary aspect.

First, an experimental device 200 illustrated in FIG. 3(A) was manufactured.

The experimental device 200 includes a cylindrical casing in which one end is opened and the other end is closed. Moreover, the casing 21 is made of resin in this example.

The casing 21 is fixed by two fixing portions 23. Two fixing portions 23 are fixed at positions facing each other in the casing 21.

A distortion sensor 24 is attached to an inner side surface of the casing 21. More specifically, the distortion sensor 24 has a strip shape having a longitudinal direction and a lateral direction and having a first end 24a and a second end 24b at both ends in the longitudinal direction. The distortion sensor 24 is attached to the inner side surface of the casing 21 such that the longitudinal direction is a direction along an edge of an opening of the casing 21, the first end 24a is relatively close to the one fixing portion 23, and the second end 24b is relatively far from the one fixing portion 13.

In FIG. 3(A), first, an A1 portion of an outer side surface of the casing 21 was pressed. As a result, the distortion sensor 24 favorably generated a large signal.

Subsequently, both the A1 portion and an A2 portion of the outer side surface of the casing 21 were pressed. The distortion sensor 24 favorably generated a large signal.

Subsequently, a B portion of an outer bottom portion of the casing 21 was pressed. However, distortion sensor 24 generated only very small signals.

Figure 3B:
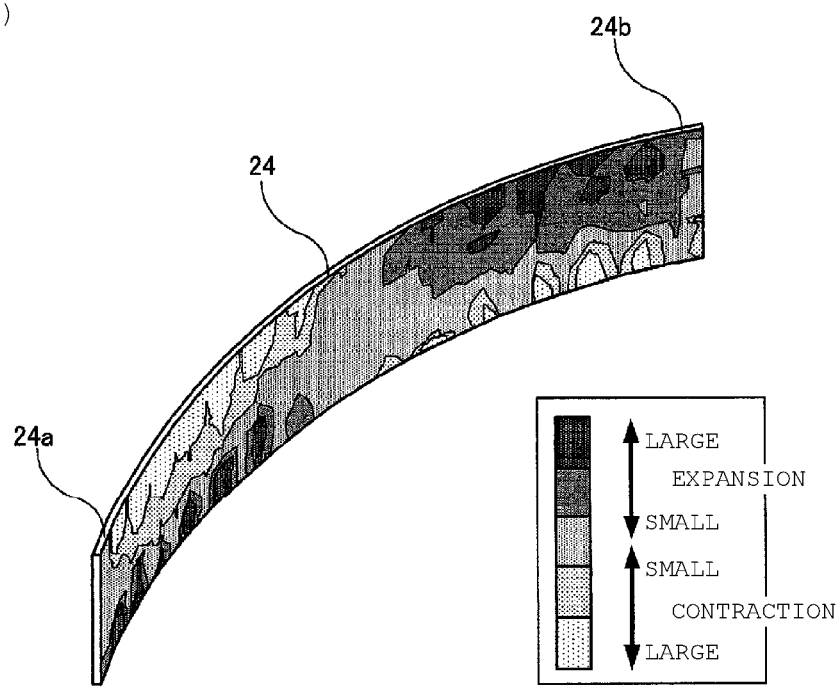
FIG. 3(B) is an explanatory diagram illustrating a behavior of a distortion sensor 24 according to an exemplary aspect.

FIG. 3(B) illustrates expansion and contraction occurring in the distortion sensor 24 when the B portion of the outer bottom portion of the casing 21 is pressed. FIG. 3(B) is obtained by simulation.

As can be seen from FIG. 3(B), the first end 24a of the distortion sensor 24 expands in the lower region and contracts in the upper region, whereas the second end 24b of the distortion sensor 24 contracts in the lower region. As a result, it is considered that the signal is canceled in the distortion sensor 24, and the distortion sensor 24 generates only a small signal.

As described above, the distortion sensor 24 favorably generates a large signal when the A1 portion or the A1 portion and the A2 portion of the outer side surface of the casing 21 is pressed, but generates only a small signal when the B portion of the outer bottom portion of the casing 21 is pressed. From the above, the effectiveness of the configuration of the exemplary embodiment is confirmed.

Experiment 2

Next, in order to examine an appropriate size of the opening of the casing (particularly the second casing), an appropriate position of the fixing portion, and an appropriate number of fixing portions in exemplary embodiment of the present invention, the following Experiment 2 was performed.

Figure 4A:
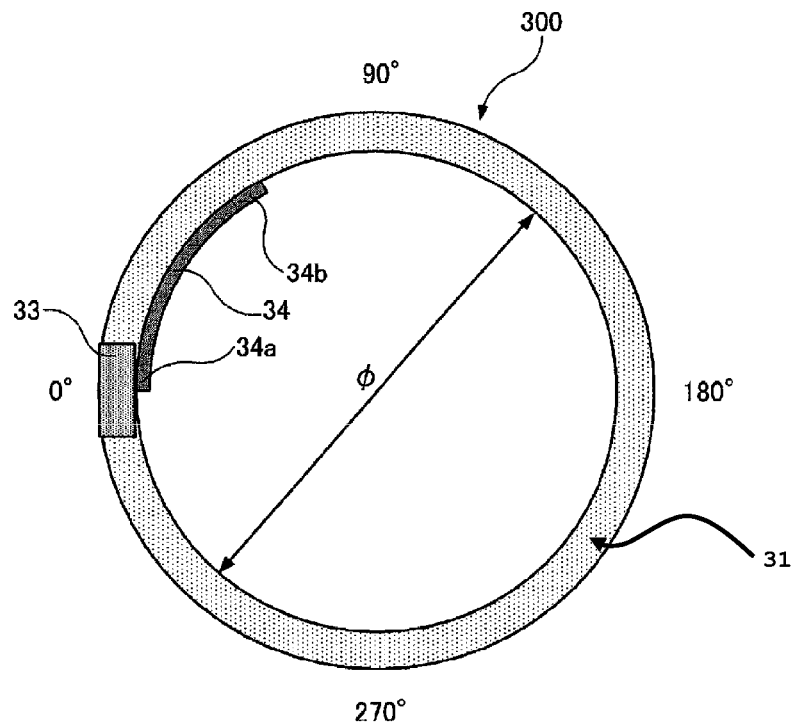
FIG. 4(A) is an explanatory diagram of an experimental device 300 according to an exemplary aspect.

First, an experimental device 300 illustrated in FIG. 4(A) was manufactured.

The experimental device 300 includes a cylindrical casing 31 in which one end is opened and the other end is closed. In the experimental device 300, three types of casings in which diameters (φ) of the openings were 20 mm, 28 mm, and 40 mm were prepared as the casing 31.

As further shown, a distortion sensor 34 is attached to an inner side surface of the casing 31. More specifically, the distortion sensor 34 has a strip shape having a longitudinal direction and a lateral direction and having a first end 34a and a second end 34b at both ends in the longitudinal direction. The distortion sensor 34 is attached to the inner side surface of the casing 31 such that the longitudinal direction is a direction along an edge of an opening of the casing 31. In Experiment 2, a length of the distortion sensor 34 in the longitudinal direction was set to 15 mm.

One fixing portion 33 is provided in the casing 31. It is noted that the position where the fixing portion 33 is provided can be varied, and a relative positional relationship between the distortion sensor 34 and the fixing portion 33 can be changed.

In FIG. 4(A), the fixing portion 33 is fixed at the first end 34a of the distortion sensor 34. An angle at this time (hereinafter, sometimes referred to as an "angle of a constraint position" for purposes of this disclosure) is set to 0°. A position of the fixing portion 33 is moved in a clockwise direction, and thus, the angle of the constraint position increases to 90°, 180°, 270°, and the like.

A width of the fixing portion 33 is preferably as small as possible in order not to hinder an appropriate operation of the distortion sensor 34. However, in the exemplary aspect of the earphone 100 or the like, a width of the claw portion 12 corresponding to the width of the fixing portion 33 requires strength for firmly fixing the first casing 1 and the second casing 2, and needs a certain size. For example, in the earphone 100, the width of the claw portion 12 should be several millimeters. Accordingly, in Experiment 2, the width of the fixing portion 33 was set to 5 mm.

Figure 4B:
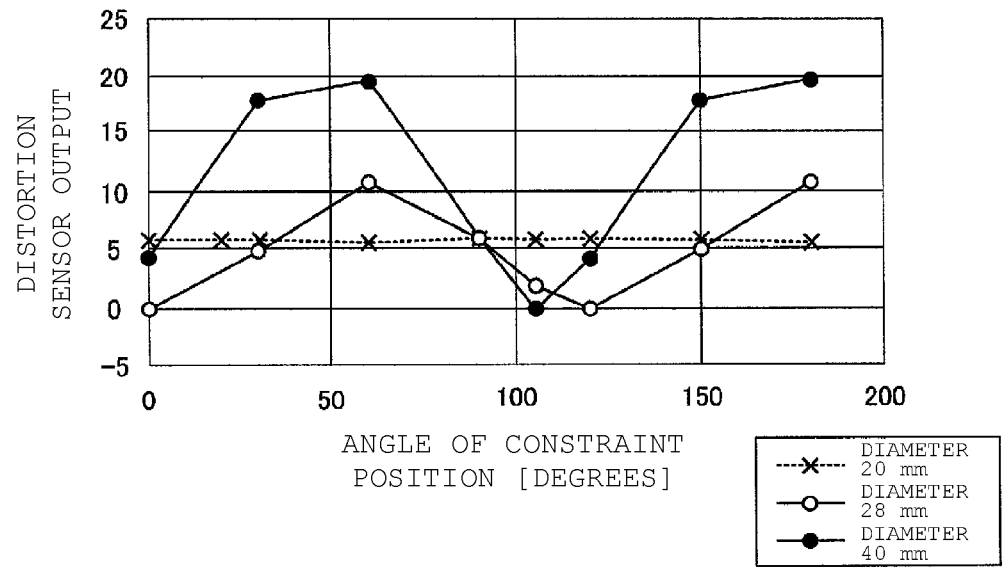
FIG. 4(B) is a graph showing a result of Experiment 2 according to an exemplary aspect.
Figure 5A:
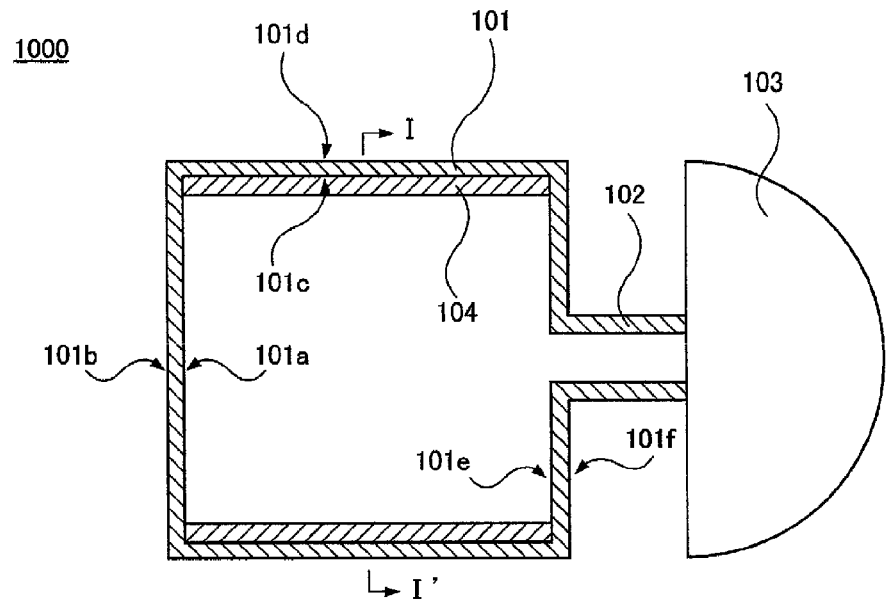
FIGS. 5(A) and 5(B) are sectional views of an earphone 1000 of the related art.
Figure 5B:
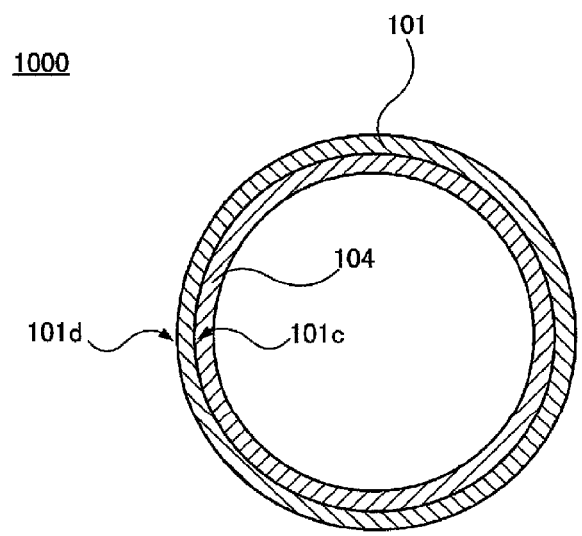

In the three types of experimental devices 300, a magnitude of an output generated by the distortion sensor 34 when the outer bottom surface of the experimental device 300 was pressed was measured while the position of the fixing portion 33 was shifted. FIG. 4(B) shows the results.

As can be seen from FIG. 4(B), when a diameter of the opening of the casing 31 was set to 20 mm, a signal having a size slightly larger than 5 was output regardless of the position of the fixing portion 33. A numerical value of the output indicates a relative magnitude for comparison. As a result, it has been found that when the diameter of the opening of the casing 31 was 20 mm, the diameter of the opening was too small to apply the present invention.

On the other hand, when the diameter of the opening of the casing 31 was set to 28 mm, the magnitude of the output of the distortion sensor 34 periodically changed by moving the position of the fixing portion 33. When the angle of the constraint position was 0° and 120°, the magnitude of the output of the distortion sensor 34 became 0.

When the diameter of the opening of the casing 31 was 40 mm, the magnitude of the output of the distortion sensor 34 periodically changed by moving the position of the fixing portion 33. When the angle of the constraint position was about 105°, the magnitude of the output of the distortion sensor 34 became 0.

As described above, it has been confirmed that the exemplary embodiment of the present invention can be favorably applied when the diameter of the opening of the casing 31 is equal to or greater than 28 mm and equal to or less than 40 mm.

For example, it has been found that when the diameter of the opening of the casing 31 is 28 mm and when the fixing portions 33 are provided at three positions where the angle of the constraint position is 0°, 120°, and 240°, though the outer bottom portion of the casing is pressed, the distortion sensor 34 does not output a signal and the first casing and the second casing can be firmly fixed.

Thus, the earphone 100 according to the exemplary embodiment has been described above. However, it is noted that the exemplary embodiment of the present invention is not limited to the above-described contents, and various changes can be made in accordance with the gist of the invention.

For example, in the embodiment, although the earphone is shown as the electronic device, the electronic device is not limited to the earphone, and can be a hearing aid, a headset, or the like. Moreover, the electronic device is not limited to devices related to voice, music, and the like, and the present invention can be applied to any type of electronic device as long as the electronic device includes a casing and a distortion sensor.

In the earphone 100, although the ear hole insertion portion 5 is provided in the first casing 1, the casing 3 (particularly, the first casing 1) may be formed as the ear hole insertion portion instead.

In the earphone 100, the locking portions 8 are provided in the first casing 1 and the claw portions 12 are provided in the second casing 2. In contrast, the claw portions 12 may be provided in the first casing 1 and the locking portions 8 may be provided in the second casing 2.

The electronic device according to the exemplary aspect is as described above in the Summary of Invention section.

In this electronic device, it is also preferable that the sounding body is provided inside the casing and at least one selected from an earphone, a hearing aid, and a headset is provided. This is because the present invention is particularly useful in these electronic devices. In this case, it is also preferable that the ear hole insertion portion that can be inserted into the human ear hole is provided on the other side of the first casing opposite to the side where the first opening is provided or the first casing is formed as the ear hole insertion portion that can be inserted into the human ear hole.

It is also preferable that the distortion sensor also serves as the sounding body and has a function of the sounding body. In this case, the number of necessary parts can be reduced, and manufacturing can be simplified to improve productivity.

It is also preferable that the other side of the second casing which is opposite to the side where the second opening is provided is closed. In this case, the hollow of the casing can be sealed except for the ear hole insertion portion.

The number of fixing portions is preferably two or three in an exemplary aspect. In this case, it is possible to firmly fix the first casing and the second casing while the distortion sensor does not to output a signal or does not output only a small signal though the outer bottom portion of the casing is pressed.

It is also preferable that the fixing portion includes the claw portion formed at one of the first casing and the second casing and the locking portion formed on the other of the first casing and the second casing and capable of locking the claw portion. In this case, the first casing and the second casing can be firmly fixed.

The width of the claw portion is preferably equal to or less than 5 mm, for example. In this case, the first casing and the second casing can be firmly fixed without hindering the appropriate operation of the distortion sensor by the fixing portion.

In the section of the second casing in a region to which the distortion sensor is attached as viewed in the opening direction of the second opening, a shape of the inner wall is preferably a circle or an ellipse, and a diameter of the circle or a length of a major axis of the ellipse is preferably equal to or greater than 28 mm and equal to or less than 40 mm. In this case, the electronic device can be provided in which the distortion sensor does not output a signal or outputs only a small signal though the outer bottom portion of the casing is pressed.

It is also preferable that the electronic device is connected to the external main body electronic device in the wired or wireless manner and transmits the signal acquired by the distortion sensor to the main body electronic device. In this case, the main body electronic device can be controlled by pressing the outer side surface of the casing. The main body electronic device is, for example, a smartphone, a tablet terminal, a personal computer, a recording and reproducing device, a video reproducing device, a radio, a television, or the like.

DESCRIPTION OF REFERENCE SYMBOLS

1: First casing
2: Second casing
3: Casing
4: First opening
5: Ear hole insertion portion
6: Side surface
6a: Inner side surface
6b: Outer side surface
7: Top surface
7a: Inner top surface
7b: Outer top surface
8: Locking portion
8a: Through-hole
8b: Locking beam
9: Second opening
10: Bottom surface
10a: Inner bottom surface
10b: Outer bottom surface
11: Side surface
11a: Inner side surface
11b: Outer side surface
12: Claw portion
12a: Column portion
12b: Claw
13: Fixing portion
14: Distortion sensor
14a: First end
14b: Second end

The invention claimed is:

1. An electronic device comprising:
a housing including at least a first casing having a first opening and a second casing having a second opening that faces the first opening when the first casing is fixed to the second casing; and
a distortion sensor attached to an inner wall of the housing and having a strip shape with a longitudinal direction and a lateral direction and having a first end and a second end at respective ends in the longitudinal direction,
wherein the first casing is fixed to the second casing by two or more fixing portions, and
wherein the distortion sensor is attached to an inner wall of the second casing such that the longitudinal direction is a direction that extends along an edge of the second opening, such that the first end is disposed towards one fixing portion of the two or more fixing portions and the second end is disposed farther from the one fixing portion than the first end.

2. The electronic device according to claim 1, further comprising a sounding body disposed inside the housing.

3. The electronic device according to claim 1, wherein the electronic device is at least one of an earphone, a hearing aid, and a headset.

4. The electronic device according to claim 2, further comprising an ear hole insertion portion configured to be inserted into a human ear hole and that is disposed on a side of the first casing that is opposite to the first opening.

5. The electronic device according to claim 2, wherein the first casing is formed as an ear hole insertion portion configured to be inserted into a human ear hole.

6. The electronic device according to claim 2, wherein the distortion sensor is configured as the sounding body.

7. The electronic device according to claim 1, wherein a side of the second casing that is opposite to the second opening is closed.

8. The electronic device according to claim 1, wherein the two or more fixing portions comprises three fixing portions.

9. The electronic device according to claim 1, wherein each of the two or more fixing portions includes a claw disposed on one of the first casing and the second casing and a locking portion disposed on another of the first casing and the second casing and that is configured to lock the claw.

10. The electronic device according to claim 9, wherein the claw has a width that is equal to or less than 5 mm.

11. The electronic device according to claim 1, wherein the inner wall has a shape that is a circle or an ellipse in a section of the second casing in a region where the distortion sensor is attached as viewed from an opening direction of the second opening.

12. The electronic device according to claim 11, wherein a diameter of the circle or a length of a major axis of the ellipse is equal to or greater than 28 mm and equal to or less than 40 mm.

13. The electronic device according to claim 1, wherein the electronic device is configured to connect to an external main body electronic device in a wired or wireless manner.

14. The electronic device according to claim 13, wherein the distortion sensor is configured to acquire a signal that is transmitted to the main body electronic device.

15. The electronic device according to claim 14, wherein the main body electronic device is at least one selected from a smartphone, a tablet terminal, a personal computer, a recording and reproducing device, a video reproducing device, a radio, and a television.

16. The electronic device according to claim 1, wherein the distortion sensor comprises a rectangular shape with longer sides extending in the longitudinal direction and shorter sides extending in the lateral direction, such that the first and second ends are disposed on opposite sides of the rectangular shape in the longitudinal direction.

17. The electronic device according to claim 16, wherein the distortion sensor comprises a piezoelectric distortion sensor that includes a pair of electrodes disposed on opposing principal surfaces of a piezoelectric sheet.

18. The electronic device according to claim 16,
wherein the first end of the distortion sensor is configured to expand in a lower region of the second casing and is configured to contract in an upper region of the second casing, and
wherein the second end of the distortion sensor is configured to contract in the lower region of the second casing and is configured to expand in the upper region of the second casing.

19. An electronic device comprising:
a housing including a pair of casings that each have respective openings configured to be coupled to each other by two or more fixing portions; and
a distortion sensor attached to an inner wall of the second casing and having a strip shape that extends in a longitudinal direction along an edge of the second opening, such that a first end of the distortion sensor is disposed towards one fixing portion of the two or more fixing portions and a second end of the distortion sensor is disposed farther from the one fixing portion than the first end.

20. The electronic device according to claim 19,
wherein the inner wall of the second casing has a shape that is a circle or an ellipse in a section of the second casing in a region where the distortion sensor is attached as viewed from an opening direction of the second opening, and
wherein a diameter of the circle or a length of a major axis of the ellipse is equal to or greater than 28 mm and equal to or less than 40 mm.

\* \* \* \* \*